(12) United States Patent
Muto

(10) Patent No.: US 6,381,240 B1
(45) Date of Patent: Apr. 30, 2002

(54) SIGNAL PROCESSING CIRCUIT AND METHOD OF SIGNAL PROCESSING

(75) Inventor: Takayasu Muto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/049,808

(22) Filed: Mar. 27, 1998

(30) Foreign Application Priority Data

Apr. 1, 1997 (JP) .............................................. 9-083138

(51) Int. Cl.[7] .................................................. H04J 3/24
(52) U.S. Cl. ....................................................... 370/389
(58) Field of Search ................................. 370/389, 442, 370/229, 428, 399, 395, 400, 401, 412–419, 230, 231, 235, 241, 252, 254; 348/384.1, 388.1, 441

(56) References Cited

U.S. PATENT DOCUMENTS 4,641,304 A * 2/1987 Chaudhuri .................. 370/447
5,528,595 A * 6/1996 Walsh et al. ................. 370/402
5,671,226 A * 9/1997 Murakami et al. ........... 370/474

* cited by examiner

Primary Examiner—Dang Ton
(74) Attorney, Agent, or Firm—Frommer Lawrence & Haug LLP; William S. Frommer

(57) ABSTRACT

A signal processing circuit capable of deciding and storing the starting packet and realizing normal data storage when packet loss occurs at the time of reception of divided packets of a serial interface and a method of the same. Processing for storage of a normal packet to an FIFO is carried out by deciding the starting packet and deciding there is packet loss when packet loss occurs and a packet does not arrive in the middle by using the value of a data block continuity counter, the value of the fraction number, and the value of the data base size set in the first quadlet of a CIP header 1 of the divided packet transmitted in for example a divided manner through an IEEE 1394 serial bus via a link core.

5 Claims, 8 Drawing Sheets

DVB

DSS

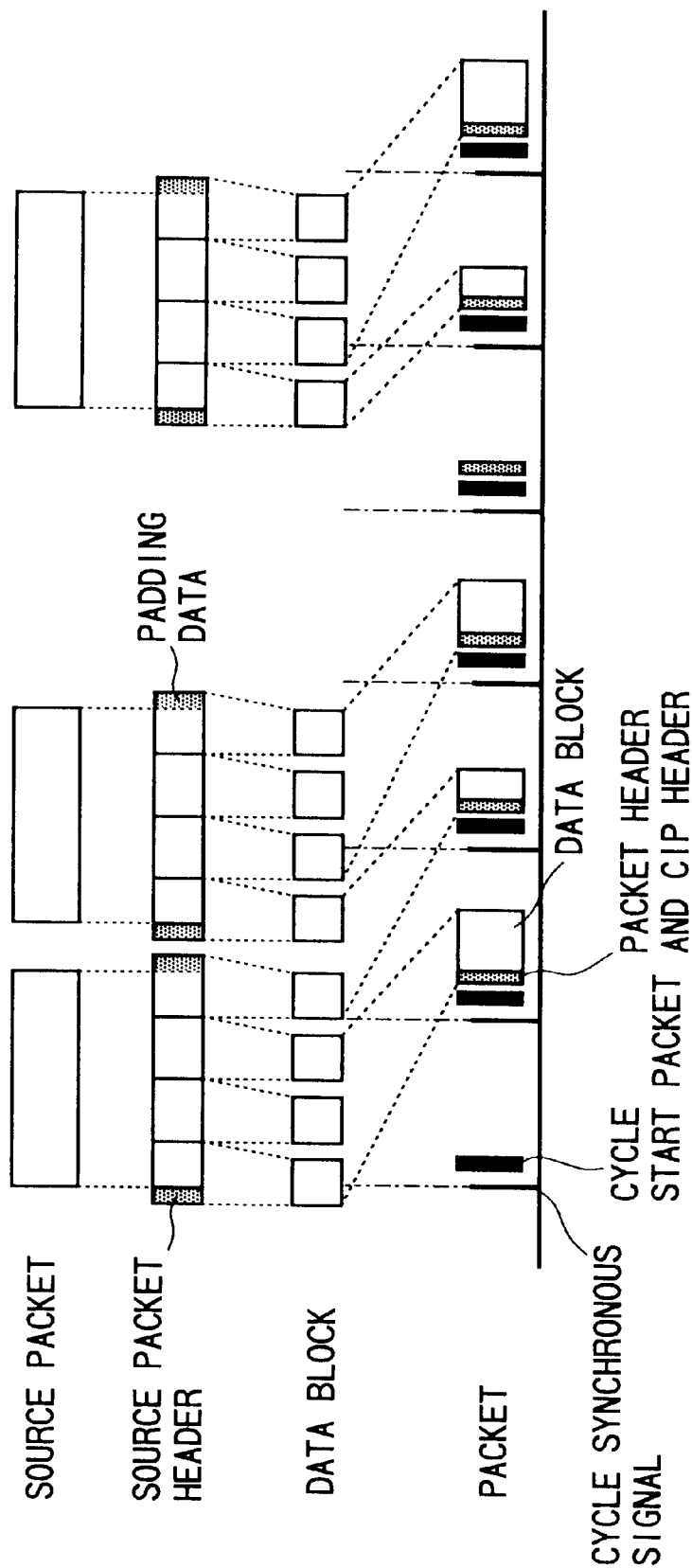

SOURCE PACKET HEADER (SPH)

SIGNAL PROCESSING CIRCUIT AND METHOD OF SIGNAL PROCESSING

BACKGROUND OF THE INVENTION

1. Field of the Invention

The present invention relates to a signal processing circuit used in a digital serial interface and a method of the same.

2. Description of the Related Art

In recent years, as an interface for transfer of multimedia data, the IEEE (Institute of Electrical and Electronic Engineers) 1394, High Performance Serial Bus for realizing high speed data transfer and real time transfer has become the standard.

The types of data transfer of this IEEE 1394 serial interface include asynchronous transfer for requests, requests for acknowledgement, and confirmation of reception of the related art and isochronous transfer with which the data is sent at one time from a certain node at 125 µs.

In this way, with an IEEE 1394 serial interface having such two transfer modes, data is transferred in units of packets.

FIGS. 4A and 4B are views of the byte size of a source packet in isochronous communication. FIG. 4A shows the size of a packet in the digital video broadcast (DVB) method; while FIG. 4B shows the size of a packet in the digital satellite system (DSS) method.

The source packet in the DVB method is comprised of 192 bytes, that is, 4 bytes of a source packet header (SPH) and 188 bytes of inherent transport stream data, as shown in FIG. 4A.

Contrary to this, the source packet in the DSS method is comprised of 144 bytes, that is, 4 bytes of a source packet header (SPH), 10 bytes of additional data (AD0 to AD9), and 130 bytes of inherent transport stream data, as shown in FIG. 4B.

The additional data is inserted between the source packet header and the data. Note that, in the IEEE 1394 standard, the unit of minimum data able to be handled is one quadlet (=4 bytes=32 bits), therefore the transport stream data and the additional data must be set to be able to be comprised in total of 32 bit units.

Note that at the default, no additional byte is set.

FIG. 5 is a view of an example of a correspondence between the original data when data is transmitted in the isochronous communication of the IEEE 1394 standard and the packets actually transmitted.

As shown in FIG. 5, each of the source packets of the original data is given a source packet header of 4 bytes and padding data for adjusting the data length and then is divided into a predetermined number of data blocks.

Note that since the unit of data when transferring a packet is one quadlet (4 bytes), the byte lengths of data blocks, various headers, etc. are all set to multiples of 4.

FIG. 6 is a view of the format of the source packet header.

As shown in FIG. 6, in 25 bits in the source packet header is written a time stamp utilized for suppressing jitter when for example MPEG (Moving Picture Experts Group)-TS (Transport Stream) data utilized in a digital satellite broadcast etc. of the above DVB method is transmitted by isochronous communication.

Such a packet header, a common isochronous packet (CIP) header, or other data is then added to a predetermined number of data blocks so as to produce the final packets.

FIG. 7 is a view of an example of the basic configuration of an isochronous communication use packet.

As shown in FIG. 7, in a packet for isochronous communication, the first quadlet is comprised of a 1394 header, the second quadlet a Header-CRC, the third quadlet a CIP-header 1, the fourth quadlet a CIP-header 2, the fifth quadlet a source packet header (SPH), and the sixth quadlet and subsequent quadlets the data regions. The final quadlet is a Data-CRC.

The 1394 header is comprised by a "data-length" representing the data length, a "channel" indicating number of the channel (one of 0 to 63) transferred through this packet, a "code" representing a code of processing, and a synchronous code "sy" prescribed by each application.

The Header-CRC is an error detection code of the packet header.

The CIP-header 1 is comprised by an source node ID (SID) region for the transmission node number, a data block size (DBS) region for the length of the data block, a fraction number (FN) region for the number of divisions of the data in the formation of the packet, a quadlet padding count (QPC) region for the number of the quadlets of the padding data, a source packet header (SPH) region for the flag showing the existence of the source packet header, and a data block continuity counter (DBC) region for the counter for detecting the number of isochronous packets.

Note that the DBS region shows the number of the quadlets transferred through one isochronous packet.

The CIP-header 2 is comprised by an FMT region for the signal format showing the type of the data to be transferred and a format dependent field (FDF) region utilized corresponding to the signal format.

The SPH header has a time stamp region in which is set a value obtained by adding a fixed delay value when the transport stream packet.

Further, the data CRC is the error detection code of the data field.

The signal processing circuit of the IEEE 1394 serial interface for the transmission and reception of packets having the above structure is mainly constituted by a physical layer circuit for directly driving the IEEE 1394 serial bus and a link layer circuit for controlling the data transfer of the physical layer circuit.

In the isochronous communication system in the IEEE 1394 serial interface, as shown in for example FIG. 8, the link layer circuit 2 is connected to an application, that is, MPEG transporter 1, while the link layer circuit 2 is connected to a serial interface bus BS via a physical layer circuit 3.

In the transfer of data of the IEEE 1394 serial interface, the transmission data and reception data are stored once in a storage device such as a first-in first-out (FIFO) memory (hereinafter simply referred to as an FIFO) provided in the link layer circuit 2. In actuality, an asynchronous packet use FIFO and an isochronous packet use FIFO are separately provided.

Sometimes, however, as mentioned above, one source packet of the usual MPEG transport stream is transmitted divided.

In this case, at the reception side, it is necessary to judge the first packet of the source packet from the packets sent divided and store the same in the FIFO.

Further, since they are sent divided, if a packet being transmitted is lost due to noise or other factors, normal storage of data is no longer possible.

In the current IEEE 1394 serial interface signal processing circuits, however, no system has been established for processing received packets transmitted divided.

SUMMARY OF THE INVENTION

The present invention was made in consideration with such a circumstance and has as an object thereof to provide a signal processing circuit capable of determining and storing a starting packet at the time of reception of divided packets by a serial interface and capable of realizing normal storage of data when packet loss occurs and a method of the same.

To achieve the above object, the present invention provides a signal processing circuit for receiving packet data transmitted in a divided manner through a serial interface bus in a predetermined time cycle and outputting the packet data to an application side, having a means for selecting a desired packet from among the received divided packets.

Further, the present invention provides a signal processing circuit for receiving packet data transmitted in a divided manner through a serial interface bus in a predetermined time cycle and given control information indicating the number of transmission packets and outputting the packet data to the application side, having a means for deciding whether or not a packet is a starting packet from predetermined bit information of the control information given to the received divided packets.

Further, the present invention provides a signal processing circuit for receiving packet data transmitted in a divided manner through a serial interface bus in a predetermined time cycle and given first control information indicating the number of transmission packets and second control information indicating the number of divided packets and outputting the packet data to the application side, having a reception circuit for taking an AND logic of the first control information given to the received divided packets (value obtained by subtracting 1 from the power of 2 defining the value of the second control information as the power) and deciding the reception packet of 0 as the result of this decision as the starting packet.

Further, the present invention provides a signal processing circuit for receiving packet data transmitted in a divided manner through a serial interface bus in a predetermined time cycle and given control information indicating the number of transmission packets and outputting the packet data to the application side, having a predicting means for predicting the value of the control information of the packet received next from the control information given to a received divided packet and a determining means for comparing the control information value of the currently received packet and the prediction value predicted by the predicting means and determining an occurrence of packet loss where they do not coincide.

Further, the present invention provides a signal processing method for receiving packet data transmitted in a divided manner through a serial interface bus in a predetermined time cycle and given control information indicating the number of transmission packets and outputting the packet data to the application side, comprising the steps of predicting the value of the control information of the packet received next from the control information given to a received divided packet and comparing the control information value of the currently received packet and the predicted prediction value and determining packet loss when they do not coincide.

Further, the present invention provides a signal processing method for receiving packet data transmitted in a divided manner through a serial interface bus in a predetermined time cycle and given control information indicating the number of transmission packets, storing this once in the storing means, and outputting the packet data to the application side, comprising the steps of predicting the value of the control information of the packet received next from the control information given to a received divided packet; comparing the control information value of the currently received packet and the predicted prediction value and determining packet loss where they do not coincide; storing all of the currently received data if the pointer position before storage is the start of the bank of the storing means when the current reception data is received where it is determined that packet loss occurs; and storing the next source packet from the next address at which the source packet which was normally stored the previous time is stored where the pointer position before storage is not the start of the bank.

According to the signal processing circuit of the present invention, for example, the signal reception circuit judges if a packet is the starting packet from the predetermined bit information of the control information given to the received divided packet.

For example, the AND logic of the first control information given to the received divided packet and the (value of 2 to the power of the value of the second information minus 1) is taken and the received packet with a result of 0 is judged as the starting packet.

Further, according to the signal processing circuit of the present invention, a predicting means predicts the value of the control information of the packet to be received next from the control information given to the received divided packet. Further, the deciding means compares the value of the control information of the currently received packet and the prediction value predicted by the predicting means and decides that packet loss has occurred when they do not coincide.

Further, according to the signal processing method of the present invention, the value of the control information of the packet to be received next is predicted from the control information given to a received divided packet and the control information of the currently received packet and the predicted value are compared. When the result of the comparison is noncoincidence, it is decided that a packet was lost. When it is decided that a packet loss has occurred, all of the currently received data is stored when the pointer position before storage when the current reception data was received was the start of the bank of the storing means while the next source packet from the next address at which the previous normally stored source packet was stored is stored when the pointer position before storage was not the start of the bank.

BRIEF DESCRIPTION OF THE DRAWINGS

These and other objects and features of the present invention will become clearer from the following description of the preferred embodiments given with reference to the attached drawings, in which:

FIGS. 4A and 4B are views of a byte size of a source packet in isochronous communication, in which FIG. 4A is a view of the packet size in the DVB method and FIG. 4B is a view of the packet size in the DSS method;

FIG. 5 is a view of an example of the correspondence between original data when data is transmitted through isochronous communication of the IEEE 1394 standard and an actually transmitted packet;

DESCRIPTION OF THE PREFERRED EMBODIMENTS

Figure 1:
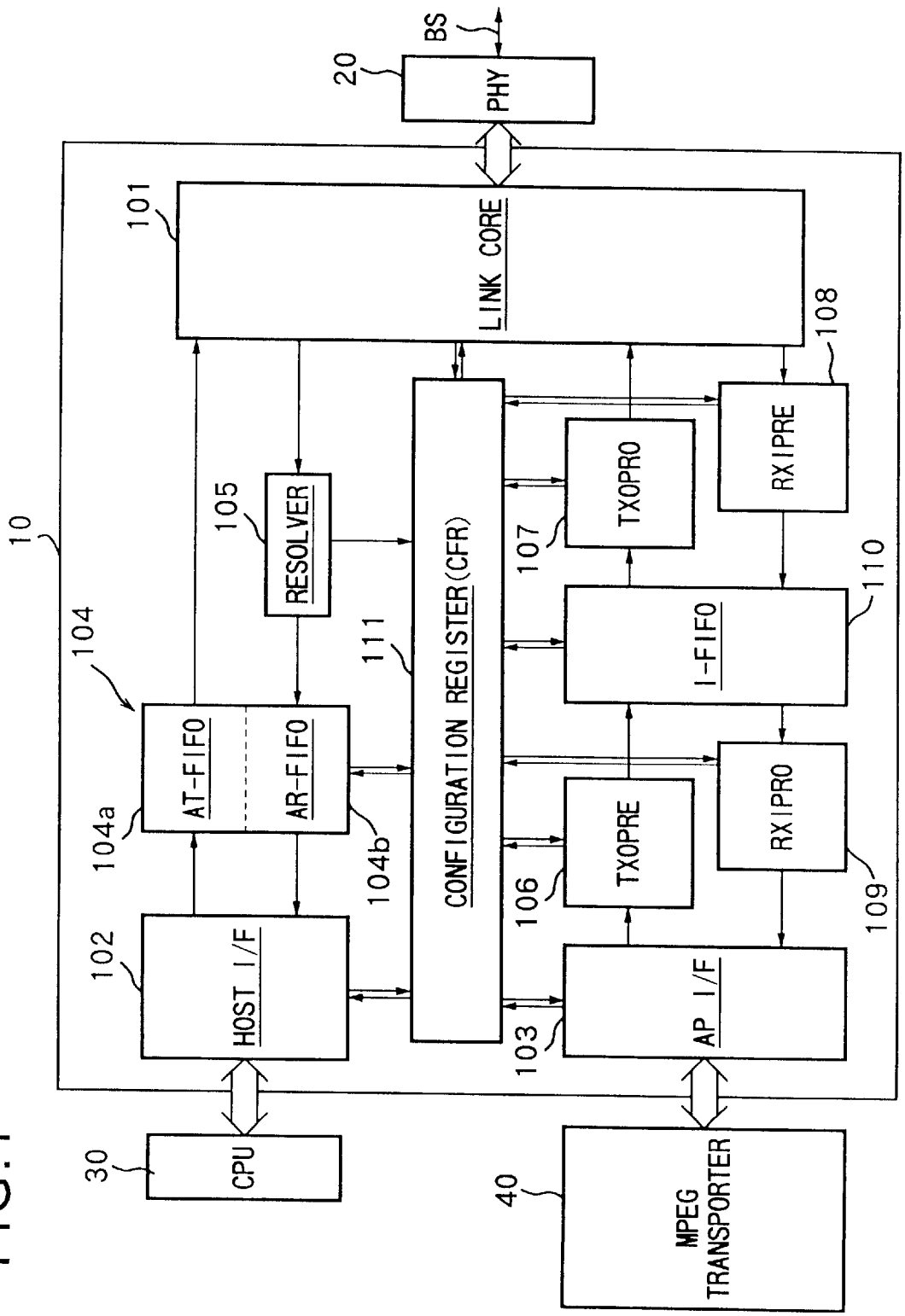
FIG. 1 is a block diagram of the configuration of an MPEG use signal processing circuit according to the present invention applied to an IEEE 1394 serial interface.

FIG. 1 is a block diagram of the configuration of an embodiment of an MPEG use signal processing circuit according to the present invention applied to an IEEE 1394 serial interface.

This signal processing circuit is constituted by a link layer circuit 10, a physical layer circuit 20, and a central processing unit (CPU) 30 serving as a host computer. Further, 40 denotes an MPEG transporter.

The link layer circuit 10 controls asynchronous transfer and isochronous transfer and controls the physical layer circuit 20 under the control of the CPU 30.

More specifically, as shown in FIG. 1, the circuit is constituted by a link core 101; a host interface circuit (Host I/F) 102; an application interface circuit (AP I/F) 103; an asynchronous communication use FIFO 104 comprising a transmission use FIFO (AT-FIFO) 104a and a reception use FIFO (AR-FIFO) 104b; a self ID use resolver 105; an isochronous communication use pre-transmission processing circuit (TXOPRE) 106; an isochronous communication use post-transmission processing circuit (TXOPRO) 107; an isochronous communication use pre-reception processing circuit (TXIPRE) 108; an isochronous communication use post-reception processing circuit (TXIPRO) 109; an isochronous communication use FIFO (I-FIFO) 110; and a configuration register (hereinafter referred to as a CFR) 111.

In the circuit of FIG. 1, an asynchronous communication system circuit is constituted by the host interface circuit 102, transmission use FIFO 104a, FIFO 104b for reception of asynchronous communication, and the link core 101.

While, an isochronous communication system circuit is constituted by the application interface circuit 103, pre-transmission processing circuit 106, post-transmission processing circuit 107, pre-reception processing circuit 108, post-reception processing circuit 109, FIFO 110, and link core 101.

The link core 101 is constituted by a transmission circuit of an asynchronous communication use packet and an isochronous communication use packet, a reception circuit, an interface circuit with the physical layer circuit 20 for directly driving the IEEE 1394 serial bus BS of these packets, a cycle timer reset at every 125 μs, a cycle monitor, and a CRC circuit. Then, the time data etc. of the cycle timer for example are supplied to the isochronous communication system processing circuit through the CFR 111.

The host interface circuit 102 mainly performs arbitration of writing, reading, etc. of the asynchronous communication use packet with the CPU 30 serving as the host computer and the transmission use FIFO 104a and reception use FIFO 104b, and arbitration of the transmission and reception of various data with the CPU 30 and CFR 111.

For example, the time stamp use delay time Txdelay set in the source packet header (SPH) of the isochronous communication use packet is set from the CPU 30 into the CFR 111 through the host interface 102.

The asynchronous communication use packet to be transmitted to the IEEE 1394 serial bus BS is stored in the transmission use FIFO 104a, while the asynchronous communication use packet transmitted through the IEEE 1394 serial bus BS is stored in the reception use FIFO 104b.

The application interface circuit 103 performs the arbitration of the transmission and reception of the MPEG transport stream data containing clock signals and control signals with the MPEG transporter 40, the isochronous communication use pre-transmission processing circuit 106, and the isochronous communication use post-reception processing circuit 109.

The resolver 105 analyzes the self ID packet transmitted through the IEEE 1394 serial bus BS and stores the same in the CFR 111.

The pre-transmission processing circuit 106 receives the MPEG transport stream data from the MPEG transporter 40 via the application interface circuit 103, and then adjusts the data length in units of quadlets (4 bytes) for the isochronous communication of the IEEE 1394 standard, adds a source packet header (SPH) of 4 bytes, and stores the result in the FIFO 110.

The time stamp for determining the data output time on the reception side is set when adding the source packet header. This is set as follows.

First, the value of the internal cycle register is latched at the time of reception of the final data of the packet from the MPEG transporter 40. Next, the delay time Txdelay set in the CFR 111 is added to the value of the cycle register from the CPU 30 via the host interface 102. Then, the added value is inserted (set) in the source packet header of the received packet as the time stamp.

Figure 2:
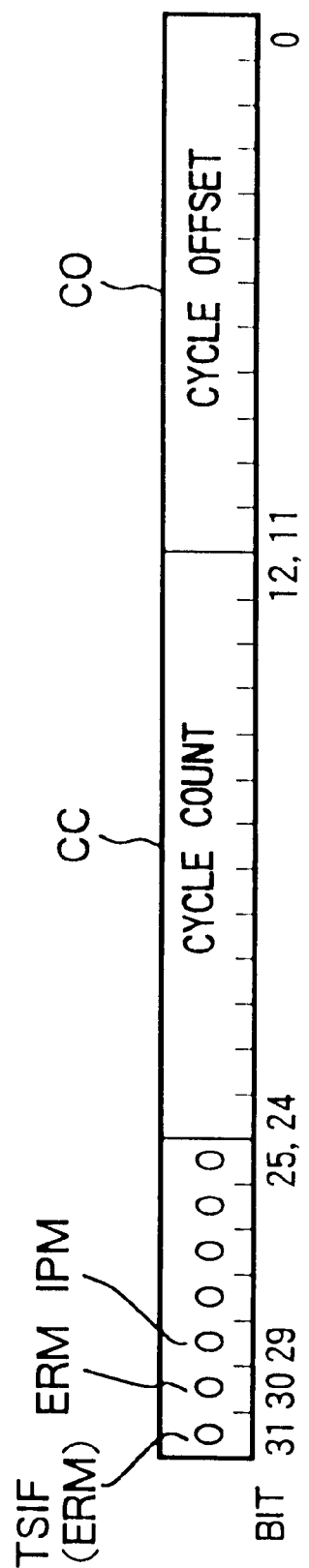
FIG. 2 is a view for explaining the concrete configuration of a time stamp.

FIG. 2 is a view for explaining the concrete configuration of the time stamp.

As shown in FIG. 2, the time stamp for determining the time of data output on the reception side shows the current time by 25 bits. Namely, the time stamp is comprised by 25 bits. The lower significant 12 bits are allocated as a cycle-offset (CO) region, while the upper significant 13 bits are allocated as a cycle-count (CC) region.

The cycle-offset counts the 125 μs of 0 to 3071 (12b 101111111111) (clock CLK=24.576 MHz), while the cycle count counts one second from 0 to 7999 (13b 1111100111111).

Accordingly, in principle, the lower significant 12 bits of the time stamp never show more than 3072, while the upper significant 13 bits never indicate more than 8000.

Figure 7:
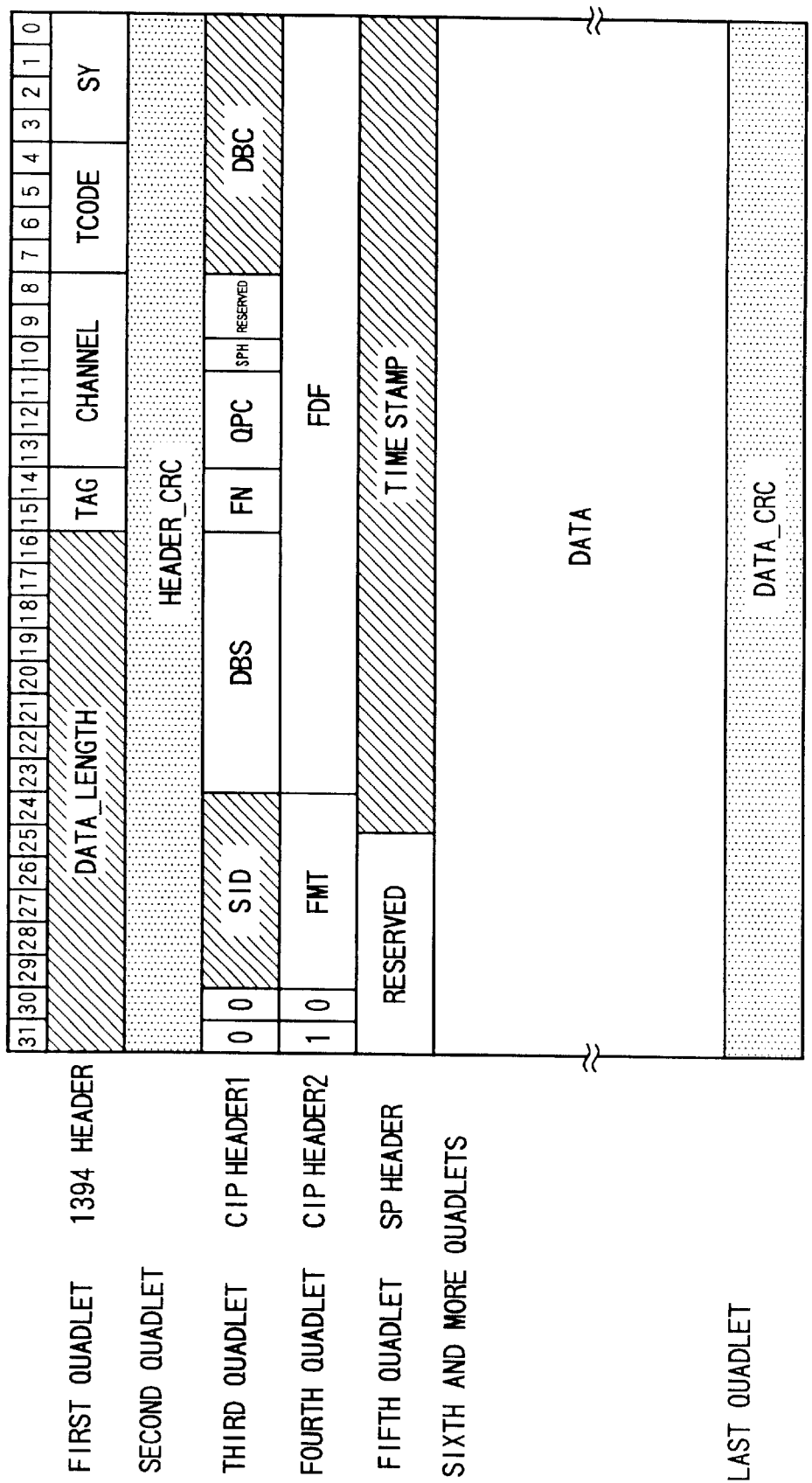
FIG. 7 is a view of an example of the basic configuration of an isochronous communication use packet.
Figure 8:
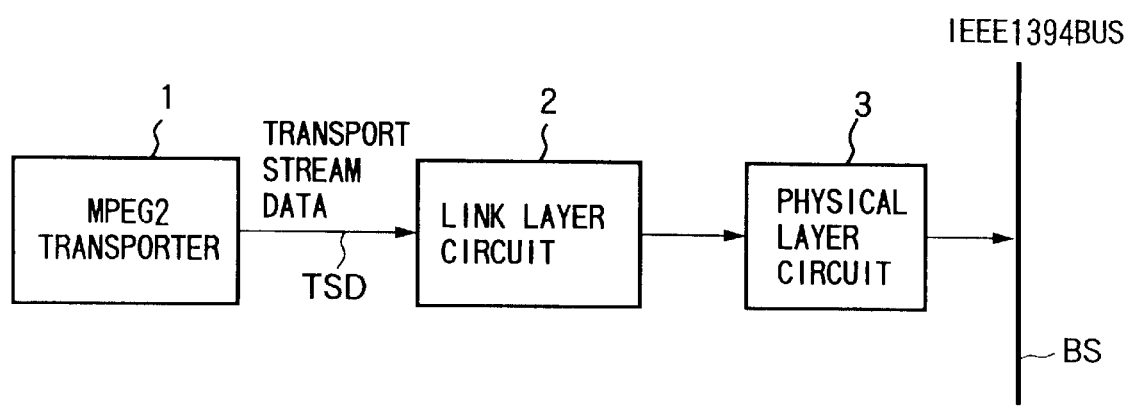
FIG. 8 is a block diagram of the basic configuration of an isochronous communication system circuit in an IEEE 1394 serial interface.

The post-transmission processing circuit 107 adds the 1394 header and CIP headers 1 and 2 to the data containing the source packet header stored in the FIFO 110 as shown in FIG. 7 and outputs the same to the transmission circuit of the link core 101.

Specifically, as shown in FIG. 7, the 1394 header comprised by the "data-length" indicating the data length, the "channel" indicating the number of the channels through which the packet is transferred (any of 0 to 63), the "tcode" indicating the code of processing, and the "synchronization code sy" defined by the applications; the CIP header 1 comprised by a source node ID (SID) region for the transmission node number, a data block size (DBS) region for the length of the data block, a fraction number (FN) region for the division of the data for forming packets, a quadlet padding count (QPC) region for the number of quadlets of the padding data, a source packet header (SPH) region for a flag representing the existence of the source packet header, and a data block continuity counter (DBC) region for the counter for detecting the number of the isochronous packets; and the CIP header 2 comprised by an FMT region for the signal format representing the type of the data to be transferred and a format dependent field (FDF) region utilized corresponding to the signal format are added.

Note that the data block size (DBS) for the length of the data block, the fraction number (FN) for the division of the data for forming the packets, and one source packet size (SPS) in the header satisfy the following relationship:

$$SPS = DBS \times FN \qquad (1)$$

Further, the data block continuity counter (DBC) for the counter for detecting the number of the isochronous packets is incremented by one whenever a data block is sent and transmitted.

The pre-reception processing circuit 108 receives the isochronous communication use packets transmitted through the IEEE 1394 serial bus BS in for example a divided manner via the link core 101, analyzes the contents of the CIP headers 1 and 2, etc., restores the data, and stores the source packet header and data in the FIFO 110.

Then, it performs the processing for analysis of the header, decides on the starting packet, decides there is a packet loss when a loss of packet occurs and no packet arrives in the middle by using the value of the data block continuity counter (DBC), the value of the fraction number (FN), and the value of the data block size (DBS) set in the first quadlet of the CIP header 1 of the divided packet and performs the processing for normal storage of the packets into the FIFO 110.

Figure 3:
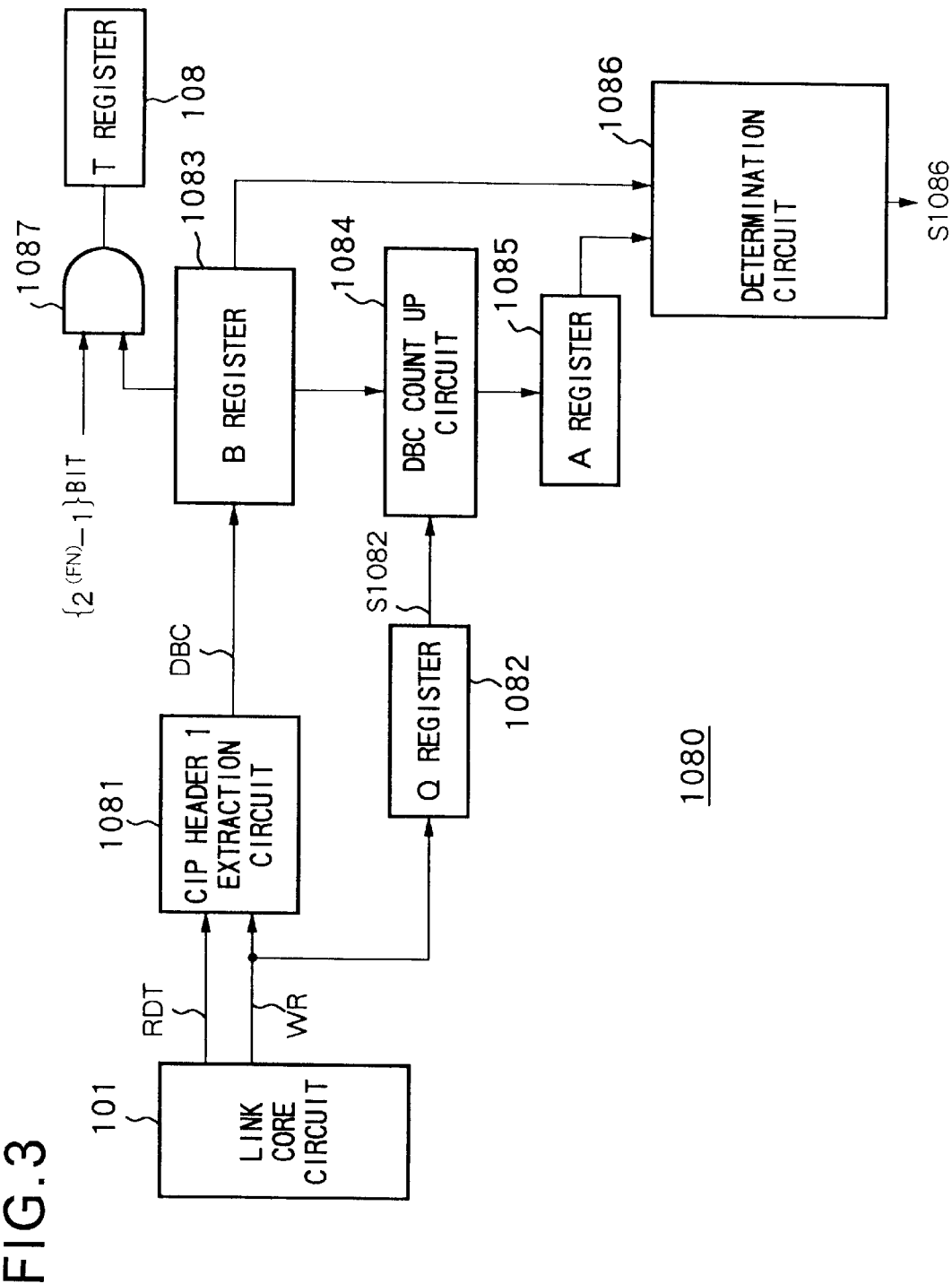
FIG. 3 is a block diagram of an example of the configuration of a detection circuit for detecting a starting packet, detecting package loss, etc. according to the present invention.
Figure 4A:
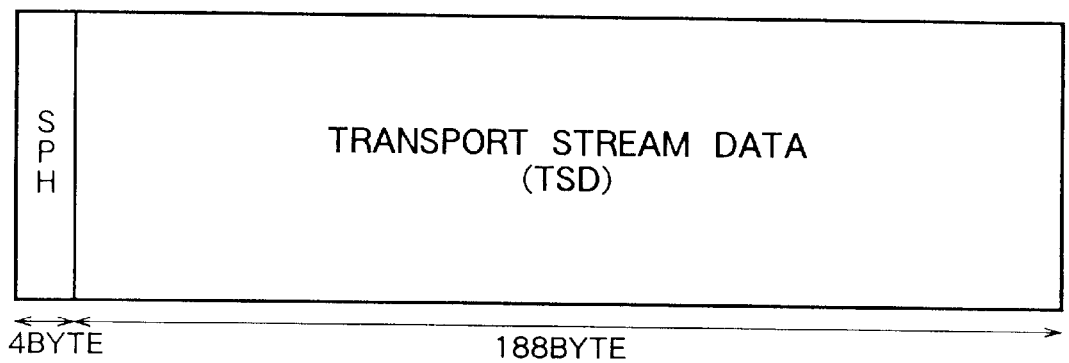
Figure 4B:
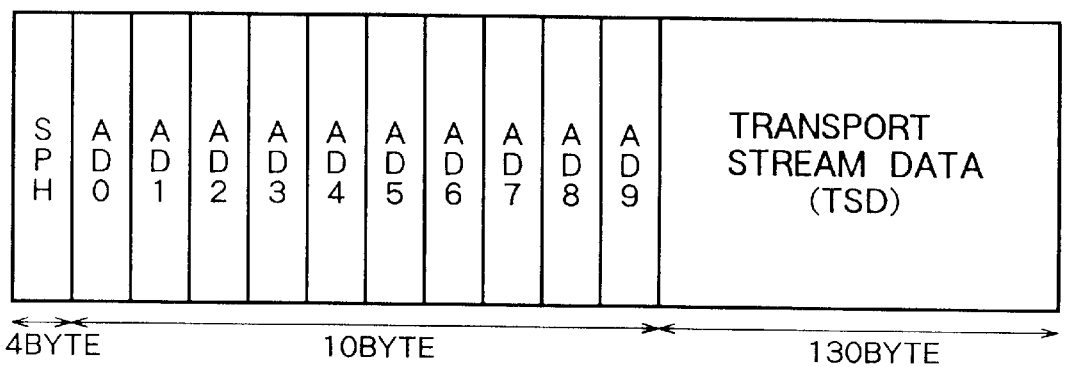
Figure 6:
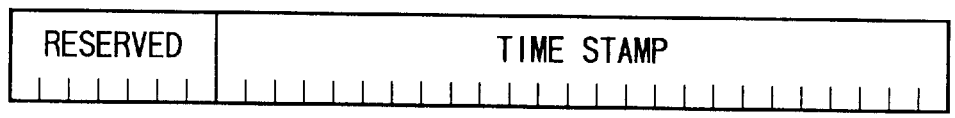
FIG. 6 is a view of the format of a source packet header.

FIG. 3 is a block diagram of an example of the configuration of a detection circuit for detecting the starting packet in the pre-reception processing circuit 108 and detecting a packet loss etc.

This detection circuit 1080 is constituted by a CIP header 1 extraction circuit 1081 which receives the reception data RDT and write pulse WR from the link core 101 as shown in FIG. 3 to extract the CIP header 1 and outputs the value of the data block continuity counter (DBC) of the reception data; a data block size (DBS) counter (Q register) 1082 which outputs a count up signal S1082 whenever write pulses of the data block size (DBS) (value of DBS region of the CIP header 1) are received; a B register 1083 for holding the value of the data block continuity counter (DBC) output from the CIP header 1 extraction circuit 1081; a DB count up circuit 1084 for incrementing the value of the B register 1083 by 1 when receiving the count up signal S1082; an A register 1085 in which the count up value of the DBC count up circuit 1084 is stored as an expected value of the data block continuity counter (DBC) of the next packet; a data block continuity counter (DBC) continuity determination circuit 1086 which decides that packets continue when the value of the B register 1083 and the value of the A register 1085 are compared and they coincide, decides that packets do not continue when they do not coincide, and outputs the signal S1086 indicating the result of decision; an AND gate 1087 for taking the AND logic of the value of the B register 1083 and (2 to the power of FN−1); and a T register 1088 in which the result of the AND logic of the AND gate 1087 is stored.

Below, an explanation will be made in order of the specific processing procedures of a data block continuity counter (DBC) count processing regarding the detection of the start of the source packets and also the detection of the packet loss, a reset processing of the storage position to the FIFO based on this, and processing where the packet loss occurs (where the discontinuity of the DBC is detected).

DBC Count Processing

One of processing performed here sometimes includes finding the expected value of the data block continuity counter (DBC) of the next packet. This processing relates to also the detection of the start of the source packets and the detection of the packet loss. Below, the specific processing procedures will be shown.

(1) When the first quadlet of the CIP header 1 is written, the DBC in this is stored in the A register 1085 and the B register 1083. Further, the Q register 1082 is reset.

(2) The value of the Q register 1082 is incremented by 1 whenever the data continuing after the CIP header (second quadlet) is written in an amount of one quadlet and compared with DBS. Where they are equal as the result of comparison, the value of the A register 1085 is incremented by 1, and the Q register 1082 is reset.

Further, the result of the AND logic of the value of the B register 1083 and (2 to the power of FN−1) is stored in the T register 1088. Then, it is decided that the position is at the start of the source packets from the fact that this AND logic is 0.

Specifically, when receiving the write pulses of data block size (DBS) at the DBS counter (Q register) 1082, the count up signal S1082 is output, this count up signal S1082 is received at the DBC count up circuit 1084, and the value of the B register 1083 is incremented by 1. The count up value thereof is stored in the A register 1085 as the expected value of the data block continuity counter (DBC) of the next packet.

Further, the AND logic of the value of the B register 1083 and (2 to the power of FN−1) is taken at the AND gate 1087, and the result of the AND logic is stored in the T register 1088.

From the fact that this AND logic is 0, it is then decided that the position is the start of the source packets.

Note that there also exists a case where the start of the source packets detected here is erroneous since the decision is performed before the check of the data-CRC, but there is no problem since the bank thereof becomes an error packet as a data-CRC error.

The above processing is repeated until the end of the packets.

(3) When the data-CRC is normal, the expected value of the data block continuity counter (DBC) is updated in the A register 1085. Note that, in this case, where the DBC continuity check skip flag is set, it is reset.

Further, when the value of the B register 1083 indicating the current value of the data base continuity counter (DBC) and the value of the A register 1085 indicating the next expected value do not coincide, the discontinuity error processing of the data base continuity counter (DBC) mentioned later is carried out.

When the data-CRC is abnormal, the data-CRC error processing is carried out.

Note that the region of the CIP header of the CFR 111 is updated at the point of time when the data-CRC becomes normal.

For reset processing of the storage position

At the start of communication etc. of the divided transmission, the start of the source packets is no longer correctly stored at the start of the packet bank (bank of FIFO 110). Therefore, where the condition stands that the data- CRC explained in the above DBC count processing is normal, the write pointer to the FIFO 110 is located at the start of the packet bank after the expected value of the data bank continuity counter (DBC) is updated to the A register 1085, and the result of the AND logic of the value of the data bank continuity counter (DBC) (value of B register) and (2 to the power of FN−1) is not 0 stands, the following reset processing is carried out.

Namely, the DBC continuity check skip flag is set. At the following reception, the reception data is not stored in the FIFO 110 until the start of the source packets arrives.

Note that, when the reception packets are all abandoned since they do not contain the start of the source packets, the DBC continuity check skip flag is set again.

At the start of reception, what is received is not always the start of the source packets of the first reception data, so the above reset processing is carried out at first.

When there is packet loss

This processing is executed after the data-CRC becomes normal. Namely, when this processing starts, all of the currently received data is stored in the FIFO 110.

The processing is divided into the following two processings depending on whether or not the position of the FIFO storing the currently received data first is the start of the packet bank.

1) Where the Pointer Position Before Storage is the Start of the Bank

Since the data-CRC is normal, the currently stored data is all valid data. However, there is a packet loss before this.

Here, the DBC discontinuity mark of the bank stored at first is set and the processing of the packet loss is commenced.

2) Where the Pointer Position Before Storage is not the Start of the Bank

All of the source packets for which packet loss was confirmed are abandoned. Namely, the procedure for storing the next source packet is started from the next FIFO address of storage of the source packet which was normally stored the previous time.

Note that the pointer position before storage can be regarded as the start of the bank if the AND logic of the B register 1083 and (2 to the power of FN−1) in the DBC count processing is 0.

Further, in the processing of analysis of the header, the pre-reception processing circuit 108 decides from the data of the DBC region set in the first quadlet of the CIP header 1 if the received source packet is the normal continuous data or discontinuous, but the result of the decision is set in the error bit ERM allocated to the bit 30 which is the second bit from the most significant bit among the upper significant bits of the source packet header shown in for example FIG. 2.

Specifically, where it is normal, the error bit ERM allocated to the bit 30 as the second bit from the most significant bit among the upper significant bits of the source packet is held at "0". On the other hand, where discontinuity is decided, this error bit ERM is set to "1".

Note that before setting (writing) the error bit ERM, the information of the upper significant seven bits of the source packet header is retracted for storage in the CFR 111 (register SPH-RSV).

The post-reception processing circuit 109 reads the time data of time stamp of the source packet header stored in the FIFO 110, compares the read time stamp data (TS) and the cycle time (CT) by the cycle timer existing in the link core 101 and, where the cycle time CT is larger than the time stamp data TS, outputs the data stored in the FIFO 110 except the source packet header via the application interface circuit 103 to the MPEG transporter 40 as the MPEG use transport stream data. Then, at the time of reading this FIFO 110, where the error bit ERM is set to "1", that is, where a packet in which the DBC discontinuity mark is set is output, the error bit is first reset and for example one dummy error packet is output. Note that since this error packet indicates the discontinuity of the data base continuity counter (DBC), a packet not existing in the FIFO is inserted.

Note that the next data is read as usual from the FIFO 110 since the DBC discontinuity mark is no longer set.

As explained above, according to the present embodiment, since the present signal processing circuit is provided with the pre-reception processing circuit 108 for deciding on the starting packet and deciding there is a packet loss when packet loss occurs and a packet does not arrive in the middle by using the value of the data base continuity counter (DBC), the value of the fraction number (FN), and the value of the data block size (DBS) set in the first quadlet of the CIP header 1 of the divided packets transmitted in for example a divided manner through the IEEE 1394 serial bus BS via the link core 101 and performing the processing for normal storage of packets into the FIFO 110, there are the advantages that the starting packet can be decided and stored at the time of reception of the divided packets at the serial interface and that normal data storage can be realized when packet loss occurs.

As explained above, according to the present invention, it is possible for the reception side to judge the starting packet of source packets from among packets sent divided and to store the same in a memory means.

Further, there is the advantage that it is possible to normally store data when a packet is lost during divided transmission.

While the invention has been described with reference to specific embodiments chosen for purposes of illustration, it should be apparent that numerous modifications could be made thereto by those skilled in the art without departing from the basic concept and scope of the invention.

What is claimed is:

1. A signal processing circuit for receiving a packet data stream formed from a source packet divided into plural transmit packets that are transmitted through a serial interface bus in a predetermined time cycle and for receiving from said data stream first control information on the number of transmit packets and second control information indicating a number FN of the transmit packets to which the source packet is divided, said signal processing circuit outputting the packet data included in the received stream to an application side, comprising:

a reception circuit for processing by a logic AND operation the number indicated by the first control information of the received transmit packets and $2^{FN}-1$, such that if the result of said AND logic is 0 a reception packet is a starting packet.

2. A signal processing circuit for receiving a packet data stream formed from a source packet divided into plural transmit packets that are transmitted through a serial interface bus in a predetermined time cycle and for receiving from said data stream control information indicating the number of transmit packets that have been transmitted, said signal processing circuit outputting the packet data included in the received stream to an application side, comprising:

predicting means for predicting a value of the control information of a packet received next from the control information associated with a received transmit packet; and determining means for comparing the control information value of a currently received transmit packet and the prediction value predicted by the predicting means to determine the occurrence of packet loss when the compared values do not coincide.

3. A signal processing circuit according to claim 2, further comprising:

a storing means for storing reception data; and a reception circuit for storing said received transmit packets in a storage bank, said reception circuit inserting a dummy error packet into said storage bank directly after a transmit packet last received by said signal processing circuit if packet loss occurs and inserting into said storage bank directly after said dummy error packet a transmit packet received following said packet loss.

4. A signal processing method for receiving a packet data stream formed from a source packet divided into plural transmit packets that are transmitted through a serial interface bus in a predetermined time cycle and for receiving from said data stream control information indicating the number of transmit packets that have been transmitted, said signal processing method outputting the packet data included in the received stream to an application side, comprising the steps of:

predicting a value of the control information of a packet received next from the control information associated with a received transmit packet; and comparing the control information value of a currently received transmit packet and the predicted value and determining packet loss when the compared values do not coincide.

5. A signal processing method for receiving a packet data stream formed from a source packet divided into plural transmit packets that are transmitted through a serial interface bus in a predetermined time cycle and for receiving from said data stream control information indicating the number of transmit packets that have been transmitted, said signal processing method outputting the packet data included in the received stream to an application side, comprising the steps of:

predicting the value of the control information of a pack received next from the control information associated with a received transmit packet;

comparing the control information value of a currently received transmit packet and the predicted value and determining packet loss when the compared values do not coincide;

storing received transmit packets in a storage bank;

inserting a dummy error packet into said storage bank directly after a last received transmit packet;

inserting into said storage bank directly after said dummy error packet a transmit packet received following said packet loss.

* * * * *